United States Patent [19]
Katsuma et al.

[11] Patent Number: 4,495,432
[45] Date of Patent: Jan. 22, 1985

[54] PIEZOELECTRIC VIBRATION WAVE MOTOR WITH SLOPED DRIVE SURFACE

[75] Inventors: Makoto Katsuma, Kawasaki; Hiroyasu Murakami, Tokyo; Akira Hiramatsu, Yokohama, all of Japan

[73] Assignee: Canon Kabushiki Kaisha, Tokyo, Japan

[21] Appl. No.: 558,004

[22] Filed: Dec. 5, 1983

[30] Foreign Application Priority Data

Dec. 15, 1982 [JP] Japan ................... 57-219532
Dec. 27, 1982 [JP] Japan ................... 57-234720
Jan. 31, 1983 [JP] Japan ................... 58-14246

[51] Int. Cl.³ ............................................. H01L 41/08
[52] U.S. Cl. ................................ 310/328; 310/82; 310/321
[58] Field of Search ............... 310/317, 328, 321, 82

[56] References Cited

U.S. PATENT DOCUMENTS

| | | | |
|---|---|---|---|
| 2,275,827 | 3/1942 | Plensler | 310/82 |
| 4,019,073 | 4/1977 | Vishnevsky et al. | 310/8.2 |
| 4,400,641 | 8/1983 | Vishnevsky et al. | 310/328 |

FOREIGN PATENT DOCUMENTS 0612357  6/1978  U.S.S.R. ................ 310/328

*Primary Examiner*—Mark O. Budd
*Attorney, Agent, or Firm*—Fitzpatrick, Cella, Harper & Scinto

[57] ABSTRACT

In a vibration wave motor, a plurality of electrostrictive elements are phase-differentially arranged or polarized on a ring-shaped vibration member having a thickness which increases as it radially goes from a center to an outer circumference, periodic voltages are applied to the electrostrictive elements to generate a travelling vibration wave in the vibration member, and a movable member press-contacted to the vibration member is friction-driven by the travelling vibration wave.

5 Claims, 13 Drawing Figures

PIEZOELECTRIC VIBRATION WAVE MOTOR WITH SLOPED DRIVE SURFACE

BACKGROUND OF THE INVENTION

1. Field of the Invention

The present invention relates to an improvement in a structure of a vibration wave motor driven by a travelling vibration wave.

2. Description of the Prior Art

As disclosed in U.S. Pat. No. 4,019,073, a vibration wave motor transduces a vibration motion generated in an electrostrictive element when a periodic voltage is applied thereto to a rotational motion or a linear motion. Since, unlike a conventional electric motor, a vibration wave motor does not require a winding it is simple in construction and compact in size and produces a high torque even at a low rotating speed and has a low inertia moment.

However, in the known vibration wave motor, in transducing the vibrative motion to rotational motion, a movable member such as a rotor which contacts a vibration member is unidirectionally friction-driven by a standing vibration wave generated in the vibration member. In a forward movement of the vibration member, the movable member frictionally contacts the vibration member, and in a backward or return movement, the movable member is moved away from the vibration member. Thus, the vibration member and the movable member must be constructed such that they contact each other within a very small distance range, that is in a point contact or a line contact. As a result, the efficiency of the friction drive is very low.

Further, since the drive force acts only in a given direction, a direction of movement of the movable member is unidirectional. In order to move the movable member reversely, it is necessary to mechanically switch the direction of vibration by another vibration member. Thus, in order to attain a reversibly rotatable vibration wave motor, a complex apparatus is required and the advantages of the vibration wave motor, that is, simple construction and compactness are substantially lost.

In order to resolve the above problem, a vibration wave motor driven by a travelling vibration wave has recently been proposed.

FIG. 1 shows a developed view of such a vibration wave motor.

A vibration absorber 4, a metal ring vibration member 2 having electrostrictive elements 3 arranged thereon and a vibration member 1 are inserted, in this sequence, to a central cylinder 5a of a stator 5 serving as a base. The stator 5, the absorber 4 and the vibration member 2 are mounted such that they do not rotate relative to each other. The movable member 1 is pressed to the vibration member 2 by its gravity or biasing means, not shown, to maintain the integrity of the motor. A plurality of electrostrictive elements 3a are arranged at a pitch equal to one half of a wavelength λ of a vibration wave, and a plurality of electrostrictive elements 3b are also arranged at a pitch of λ/2. The plurality of electrostrictive elements 3 may be a single ring-shaped element polarized at the pitch of λ/2 to form polarized areas 3a and 3b as shown in FIG. 2. The electrostrictive elements 3a and 3b are phase-differentially arranged at a pitch of $(n_o+\frac{1}{2})\lambda$, where $n_o=0, 1, 2, 3, \ldots$. Lead wires 11a are connected to the respective electrostrictive elements 3a and lead wires 11b are connected to the respective electrostrictive elements 3b, and the lead wires 11a and 11b are connected to an AC power supply 6a and a 90° phase shifter 6b (see FIG. 3). A lead wire 11c is connected to the metal vibration member 2 and it is connected to the AC power supply 6a. A friction area 1a of the movable member 1 is press-contacted to the vibration member 2 formed with a hard surface to enhance a frictional force and reduce abrasion.

FIG. 3 illustrates the generation of the vibration wave in the motor of FIGS. 1 and 2. While the electrostrictive elements 3a and 3b bonded to the metal vibration member 2 are shown adjacent to each other for the sake of convenience of explanation, they meet the requirement of phase difference of λ/4 described above and are essentially equivalent to the arrangement of the electrostrictive elements 3a and 3b of the motor shown in FIG. 1. Symbols ⊕ in the electrostrictive elements 3a and 3b indicate that they expand in a positive cycle of the AC voltage and symbols ⊖ indicate that they shrink in the positive cycle.

The metal vibration member 2 is used as one of electrodes for the electrostrictive elements 3a and 3b, an AC voltage of $V=V_0 \sin \omega t$ is applied from the AC power supply 6a to the electrostrictive elements 3a, and an AC voltage of $V=V_0 \sin (\omega t \pm \pi/2)$ which is phase-shifted by λ/4 is applied to the electrostrictive elements 3b from the AC power supply 6a through the 90° phase shifter 6b. A sign + or − in the equation is selected by the phase shifter 6b depending on the direction of movement of the movable member 1 (not shown in FIG. 3). When the sign + is selected, the phase is shifted by +90° and the movable member 1 is moved forwardly, and when the sign − is selected, the phase is shifted by −90° and the movable member 1 is moved reversely. Let us assume that the sign − is selected and a voltage of $V=V_0 \sin (\omega t - \pi/2)$ is applied to the electrostrictive elements 3b. When only the electrostrictive elements 3a are vibrated by the voltage of $V=V_0 \sin \omega t$, a standing vibration wave is generated as shown in FIG. 3(a), and when only the electrostrictive elements 3b are vibrated by the voltage of $V=V_0 \sin (\omega t - \pi/2)$, a standing vibration wave as shown in FIG. 2(b) is generated. When the two AC voltages having the phase difference therebetween are simultaneously applied to the electrostrictive elements 3a and 3b, the vibration wave travels. FIG. 3(c) shows a wave at time $t=2n\pi/\omega$, FIG. 3(d) shows a wave at $t=\pi/\omega+2n\pi/\omega$ and FIG. 3(f) shows a wave at $t=3\pi/2\omega+2n\pi/\omega$. A wavefront of the vibration wave travels in an x-direction.

The travelling vibration wave includes a longitudinal wave and a lateral wave. At a mass point A of the vibration member 2 shown in FIG. 4, a longitudinal amplitude u and a lateral amplitude w causes a counterclockwise rotating elliptic motion. Since the movable member 1 is press-contacted to the surface of the vibration member 2 and it contacts to only an apex of the vibration plane, it is driven by components of the longitudinal amplitude u of the elliptic motion of the mass points A, A', ... at the apexes so that the movable member 1 is moved in a direction of an arrow N.

When the phase is shifted by 90° by the 90° phase shifter, the vibration wave travels in a −x direction and the movable member 1 is moved oppositely to the arrow N.

In this manner, in the vibration wave motor driven by the travelling vibration wave, the forward and reverse directions of rotation can be switched with a very simple construction.

A velocity of the mass point A at the apex is represented by V=2πfu (where f is the vibration frequency). A velocity of the movable member 1 depends on the velocity of the mass point A and also on the lateral amplitude w because of the frictional drive by the press-contact. Thus, the velocity of the movable member 1 is proportional to the magnitude of the elliptic motion of the mass point A, and the magnitude of the elliptic motion is proportional to the voltage applied to the electrostrictive elements.

However, as described above, in the prior art vibration wave motor, a resonance frequency in an inner circumference of the vibration member 2 is different from that in outer circumference because the thickness of the vibration member 2 is constant. Accordingly, in the prior art vibration wave motor, the resonance frequency of the vibration member 2 is that for a circumference of a certain radius between the inner circumference and the outer circumference and it impedes the resonance at a circumference other than the certain radius.

The resonance frequency f is further discussed.

$$f = \sqrt{E/3\rho} \cdot \pi h/\lambda^2 \quad (1)$$

where f ($=2\pi\omega$) is a frequency of the input voltage, E is a Young modulus of the vibration member 2, $\rho$ is a density and h is a thickness. Thus, the resonance occurs at the thickness h which meets the above relation. Because the vibration member 2 is of ring shape, the equation (1) is satisfied within a small ring width range in a diameter D of the ring, and the circumferential length $\pi D$ resonates at $n\lambda$, where $\lambda$ is a wavelength and n is a natural member.

$$\lambda = \pi D/n \quad (2)$$

Accordingly, from the equations (1) and (2), $$h = \sqrt{3\rho/E} \cdot \pi f D^2/n^2 \quad (3)$$

Since the thickness of the vibration member 2 is constant in the prior art vibration wave motor, only the diameter which meets the following modification of the equation (3) resonates.

$$D = n \sqrt[4]{\frac{h^2 E}{3\pi^2 \rho f^2}}$$

SUMMARY OF THE INVENTION

It is an object of the present invention to provide a vibration wave motor having a vibration member whose thickness increases as it radially goes from a center to an outer circumference so that the equation (3) is met and its efficiency is increased.

It is another object of the present invention to provide a vibration wave motor having one portion of a ring vibration member whose thickness increases as it radially goes from a center to an outer circumference and another portion whose thickness is uniform.

It is a further object of the present invention to provide a vibration wave motor in which a convex surface of a movable member is press-contacted to a slope of a ring vibration member whose thickness increases as it radially goes from a center to an outer circumference.

DESCRIPTION OF THE PREFERRED EMBODIMENTS

Figure 1:
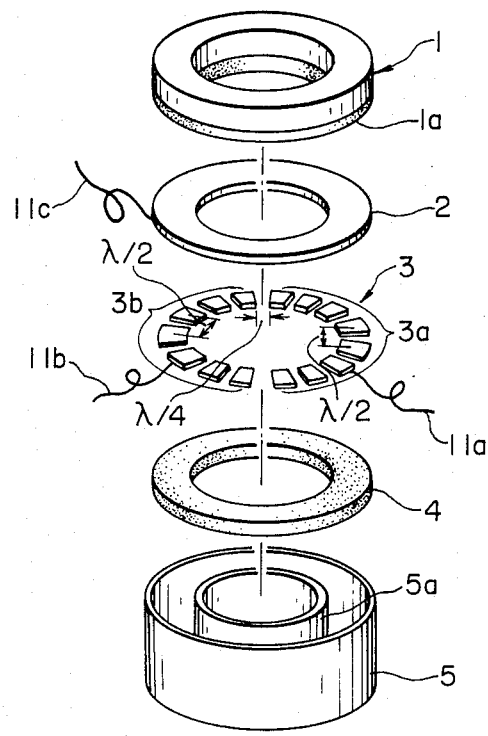
FIG. 1 is a developed view of a prior art vibration wave motor.

Preferred embodiments of the present invention will now be explained with reference to the drawings in which the like elements to those shown in FIG. 1 are designated by like numerals and the explanation thereof is omitted.

Figure 4:
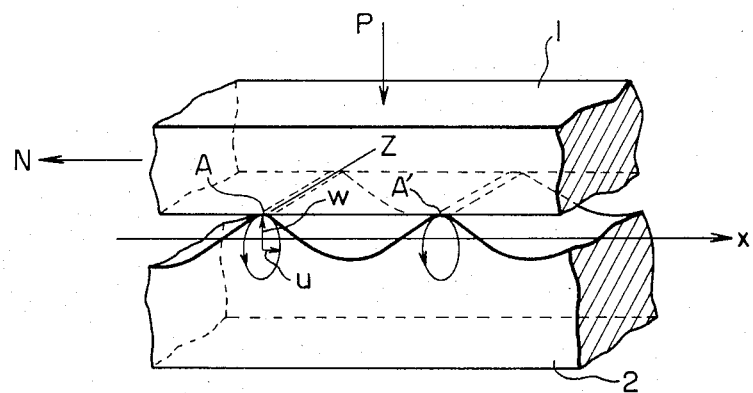
FIG. 4 shows a principle of a vibration wave motor.
Figure 5:
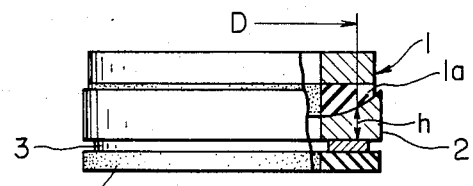
FIG. 5 shows a construction of one embodiment of the vibration wave motor of the present invention.
Figure 6:
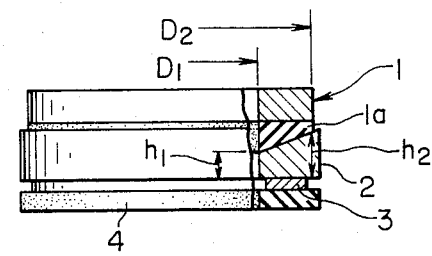
FIG. 6 shows a modification of FIG. 5.
Figure 7:
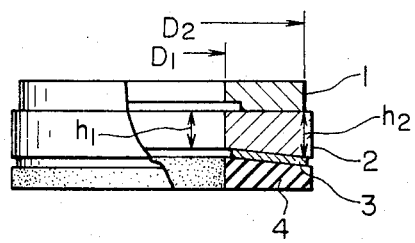
FIG. 7 shows a further modification of FIG. 5.

In FIGS. 5 to 7, a thickness of the vibration member 2 increases as it radially goes from a center to an outer circumference. Numeral 4 denotes the vibration absorber, numeral 2 denotes the metal ring vibration member having the electrostrictive element 3 bonded thereto and numeral 1 denotes the vibration member. FIG. 5 shows a first embodiment of the present invention. The vibration member 2 has a planar surface facing the electrostrictive element 3 and a quadratic curved surface facing the movable member 1 so that the thickness of the vibration member 2 increases as it radially goes from the center to the outer circumference. In the embodiment of FIG. 5, since the quadratic curve of the surface of the vibration member 2 facing the movable member 1 meets the equation (3), a wavefront resonates in a direction of section (z-axis direction in FIG. 4) and a high drive efficiency is attained.

In FIG. 6, the vibration member 2 has a planar surface facing the electrostrictive element 3 and a surface facing the movable member 1 having a thickness $h_1 = \sqrt{3\rho/E} \cdot \pi f D_1^2/n^2$ at an inner diameter $D_1$ and a thickness $h_2 = \sqrt{3\rho/E} \cdot \pi f D_2^2/n^2$ at an outer diameter $D_2$ and a linear surface therebetween so that the thickness of the vibration member 2 increases as it radially goes from the center to the outer circumference. Since $D^2$ is sufficiently larger than $\sqrt{3\rho/E} \cdot \pi f/n^2$, a substantially entire surface of the vibration member 2 resonates and a high drive efficiency is attained.

In FIGS. 5 and 6, the surface of the vibration member 2 facing the electrostrictive element 3 is planar. Alternatively, it may be a curved or sloped like that described above or both surfaces may be curved or sloped surfaces.

In FIG. 7, the electrostrictive element 3 is bonded to the sloped surface of the vibration member 2.

Figure 8:
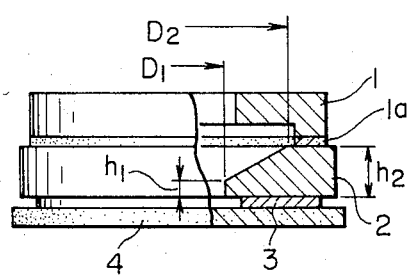
FIG. 8 shows a structure of a second embodiment of the vibration wave motor of the present invention.
Figure 9:
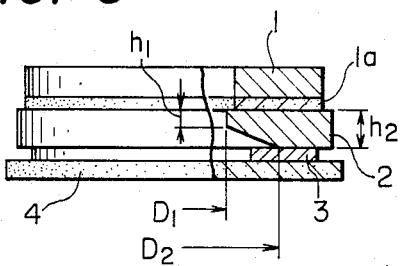
FIG. 9 shows a modification of FIG. 8.
Figure 10:
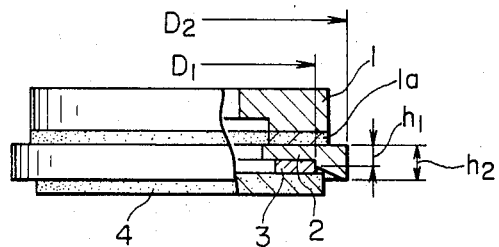
FIG. 10 shows a further modification of FIG. 8.

In FIGS. 8 to 10, a portion of the vibration member 2 has a thickness which increases as it radially goes from the center to the outer circumference and the remaining portion of the vibration member 2 has a uniform thickness. Numeral 4 denotes the vibration absorber, numeral 2 denotes the metal ring vibration member having the electrostrictive element 3 bonded thereto and numeral 1 denotes the movable member.

In FIG. 8, the vibration member 2 has a planar surface facing the electrostrictive element 3 and a surface facing the movable member 1 a portion of which slopes from the center to the outer circumference and the remaining portion of which is planar.

FIG. 8 shows a second embodiment of the present invention. The surface of the movable member 2 facing the electrostrictive element 3 is planar and the surface facing the movable member 1 has a thickness $h_1 = \sqrt{3\rho/E \cdot \pi f D_1^2/n^2}$ at an inner diameter $D_1$ and a thickness $h_2 = \sqrt{3\rho/E \cdot \pi f D_2^2/n^2}$ at an outer diameter $D_2$ and a linear surface therebetween. Since $D^2$ is sufficiently larger than $\sqrt{3\rho/E \cdot \pi f/n^2}$, a resonance region of the vibration member 2 expands and a high drive efficiency is attained.

In FIG. 9, the vibration member 2 has a planar surface facing the movable member 1 and a sloped/planar surface facing the electrostrictive element 3, contrary that of to FIG. 8. The inner diameter $D_1$ of the sloped surface and the thickness $h_1$ of the vibration member 2 at the diameter $D_1$, and the outer diameter $D_2$ of the sloped surface and the thickness $h_2$ of the vibration member 2 at the diameter $D_2$ meet the relation of the equation (3).

FIG. 10 shows another modification. The vibration member 2 has a sloped surface facing the electrostrictive element 3 on an outer periphery of the electrostrictive element 3.

Figure 11:
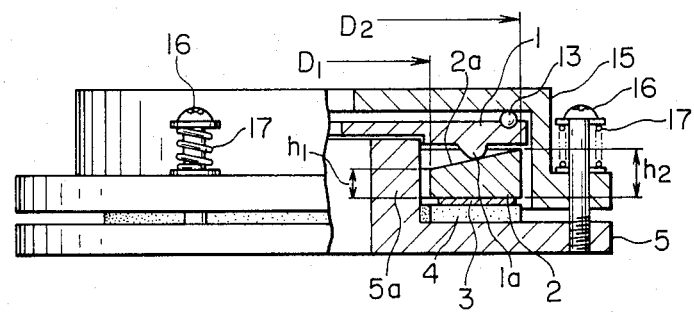
FIG. 11 shows a structure of a third embodiment of the vibration wave motor of the present invention.
Figure 12:
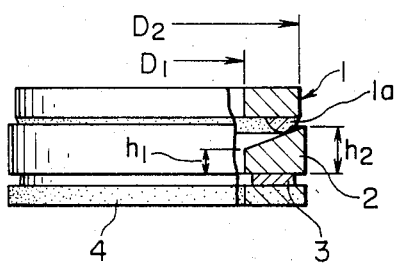
FIG. 12 shows a modification of FIG. 11.

In FIGS. 11 and 12, the thickness of the vibration member increases as it radially goes to the outer circumference and a convex surface of the movable member 1 is press-contacted to the sloped surface. In FIG. 11, the vibration absorber 4, the metal ring vibration member 2 having the electrostrictive element 3 bonded thereto and the movable member 1 are inserted, in this sequence, to the central cylinder 5a of the stator 5 which serves as the base. The stator 5, the absorber 4 and the vibration member 2 are attached such that they do not rotate relative to each other. The cover 15 is press-contacted to the stator 5 by biasing means comprising the spring 17 and the bolt 16 to cover the parts and maintain the integrity of the motor.

Figure 3:
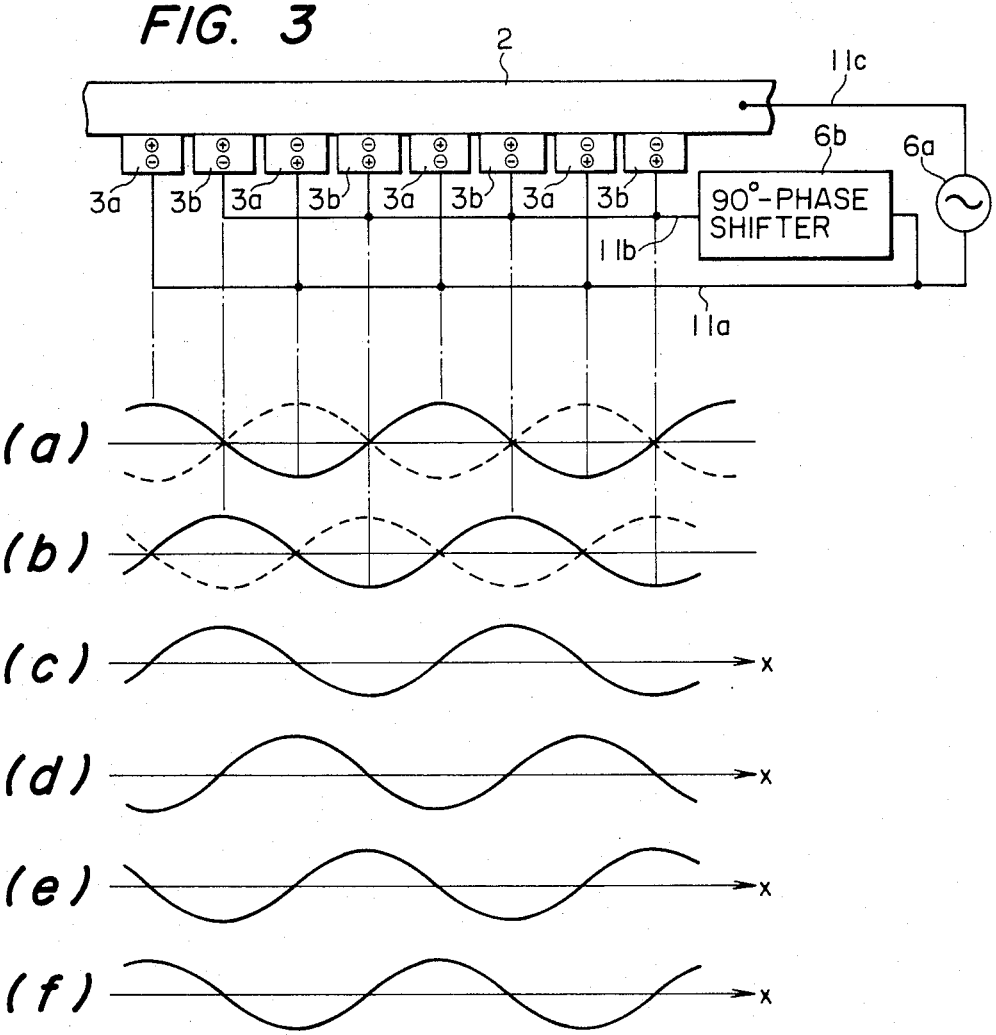
FIG. 3 illustrates a drive mechanism of the vibration wave motor.

Thus, the convex surface 1a of the movable member 1 is press-contacted to the sloped surface 2a of the vibration member 2. A thrust bearing 13 is provided between the cover 15 and the movable member 1. The electrostrictive element 3 comprises the electrostrictive element groups 3a and 3b as shown in FIG. 1. The plurality of electrostrictive elements 3a are arranged at the pitch of one half of the wavelength λ of the vibration wave, and the plurality of electrostrictive elements 3b are also arranged at the pitch of λ/2. The lead wires 11a are connected to the respective electrostrictive elements 3a and the lead wires 3b are connected to the respective electrostrictive elements 3b. The lead wires 3a and 3b are connected to the AC power supply 6a and the 90° phase shifter 6b (see FIG. 3). The lead wire 11c is connected to the metal vibration member 2 and it is connected to the AC power supply 6a.

The convex surface 1a of the movable member 1 may be made of hard rubber as shown in FIG. 12 in order to increase the frictional force and reduce abrasion. The absorber 4 is made of rubber or felt to prevent mechanical vibration from being transmitted to the stator 5.

The vibration member 2 has a planar surface facing the electrostrictive element 2 and a surface facing the movable member 1 which has the thickness $h_1 = \sqrt{3\rho/E \cdot \pi f D_1^2/n^2}$ at the inner diameter $D_1$ and the thickness $h_2 = \sqrt{3\rho/E \cdot \pi f D_2^2/n^2}$ and a linear surface therebetween. Since $D^2$ is sufficiently larger than $\sqrt{3\rho/E \cdot \pi f/n^2}$, substantially the entire surface of the vibration member 2 resonates and a high drive efficiency is attained. When the sloped surface has a quadratic or substantially quadratic surface in which the thicknesses $h_1$ and $h_2$ meet the equation (3), a higher drive efficiency is attained. Since the movable member 1 contacts the sloped surface 2a at the convex surface 1a, the friction area is relatively narrow and a uniform surface contact is easily attained. Accordingly, irregular rotation of the movable member 1 does not occur.

In order to obtain a frictional force with a relatively narrow friction area, it is necessary to increase the press-contact force. By using the convex surface facing the movable member, a variation of the thrust force due to the abrasion is prevented and the constant press-contact force is obtained.

Figure 13:
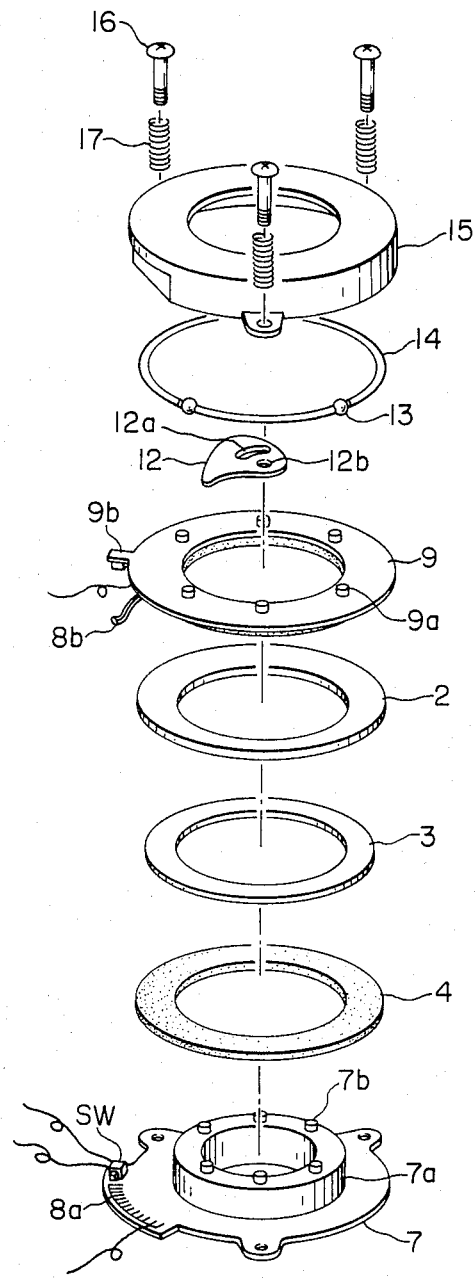
FIG. 13 shows a developed view of a diaphragm unit which embodies the present invention.

FIG. 13 shows an embodiment in which the vibration wave motor of the present invention is incorporated in an optical lens diaphragm drive source of a camera such as a still camera, a movie camera, a television camera or a video camera, or a projector or light quantity measuring equipment such as a movie projector, an enlarger or a slide projector.

The absorber 4, the electrostrictive element 3 polarized at the pitch of λ/2, the vibration member 2 and a center hole of a rotor 9 which serves as the movable member are inserted, in this order, to a central cylinder 7a of a base 7. The absorber 4, the electrostrictive element 3 and the vibration member 2 are attached so that they do not rotate with respect to the base 7. A circular hole 12b and an arcuate hole 12a of an iris vane 12 are engaged with a projection 7b of the base 7 and a projection 9a of the rotor 9, respectively, and a thrust bearing 13 is positioned by a spacer 14 and held by a pressing cylinder 15. The pressing cylinder 15 is biased to the base 7 by a spring 7 and coupled by bolts 16 to maintain the integrity of the unit. The diaphragm unit forms a portion of a lens barrel.

Figure 2:
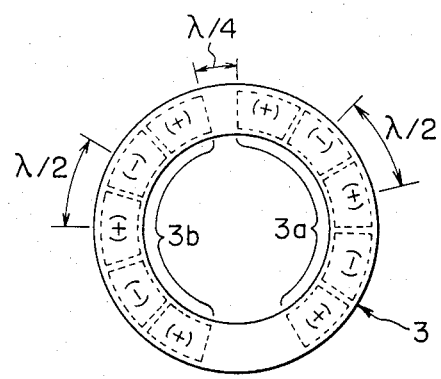
FIG. 2 shows a polarized electrostrictive element used in the motor of FIG. 1.

When AC voltages having −90° phase difference therebetween are applied to the polarized areas 3a and 3b of the electrostrictive element 3 (see FIG. 2), the rotor 9 is rotated and the iris vane 12 fitted to the projection 9a is forwardly rotated around the shafts 7b and 12b along the arcuate hole 12a. Since a plurality of iris vanes are provided to the respective projections 9a, the center aperture is stopped by the forward rotation. When the AC voltages having +90° phase difference therebetween are applied, the rotor 9 is rotated reversely and the aperture is opened. SW denotes a switch which abuts against the projection 9b of the rotor 9 when the diaphragm is opened to turn on or off the switch, and numeral 8a denotes a comb-shaped electrode which slides on an electrode 8b mounted on the rotor 9 to produce a signal representing a stopped position of the iris vanes. They are necessary for the control of the diaphragm.

What is claimed is:

1. A vibration wave motor comprising:
   a plurality of electrostrictive element groups arranged or polarized phase-differentially, said electrostrictive element groups each including at least one electrostrictive element;
   a ring-shaped vibration member for generating a travelling vibration wave when voltages having phase differences therebetween are applied to said electrostrictive element groups, said vibration member having a sloped area, a thickness of said sloped area increasing as it radially goes from a center to an outer circumference; and
   a movable member press-contacted to said vibration member such that said movable member is friction-driven by said vibration member.

2. A vibration wave motor according to claim 1 wherein said sloped area of said vibration member has a quadratic curve contour.

3. A vibration wave motor according to claim 2 wherein said quadratic curve meets an equation of $h = \sqrt{3\rho/E} \cdot \pi f D^2/n^2$.

4. A vibration wave motor according to claim 1 wherein said movable member has a projection and said projection is press-contacted to said sloped area of said vibration member.

5. A vibration wave motor according to claim 1 wherein said vibration member has a sloped area at a portion of one surface thereof and a planar area at the remaining portion.

* * * * *